United States Patent [19]
Mallarapu et al.

[11] Patent Number: 5,525,874
[45] Date of Patent: Jun. 11, 1996

[54] DIGITAL SLOPE COMPENSATION IN A CURRENT CONTROLLER

[75] Inventors: Shobha R. Mallarapu, Kokomo; Sanmukh M. Patel, Indianapolis; Brian W. Schousek, Kokomo, all of Ind.

[73] Assignee: Delco Electronics Corp., Kokomo, Ind.

[21] Appl. No.: 380,864

[22] Filed: Jan. 30, 1995

[51] Int. Cl.$^6$ .................................................. H02P 6/10
[52] U.S. Cl. ........................... 318/254; 318/432; 318/601; 318/603
[58] Field of Search ..................... 318/254, 432, 318/433, 599, 600, 601, 603, 810, 811

[56] References Cited

U.S. PATENT DOCUMENTS

| | | | |
|---|---|---|---|
| 4,558,264 | 12/1985 | Weischedel | 318/254 |
| 4,651,068 | 3/1987 | Meshkat-Razavi | 318/254 |
| 4,746,843 | 5/1988 | Taenzer | 318/138 |
| 4,757,241 | 7/1988 | Young | 318/254 |
| 4,760,316 | 7/1988 | Hedlund | 318/254 |
| 4,841,207 | 6/1989 | Cheyne | 318/811 |
| 5,079,453 | 1/1992 | Tisinger et al. | 307/491 |
| 5,210,474 | 5/1993 | Oswald | 318/254 |
| 5,296,787 | 3/1994 | Albrecht et al. | 318/433 |
| 5,466,997 | 11/1995 | Utenick et al. | 318/254 |

OTHER PUBLICATIONS

Unitrode Integrated Circuits, "The UC3842/3/4/5 Series of Current–Mode PWM IC's", 1987–88, pp. 9–107 to 9–118, Merrimack, NH 03054.

*Primary Examiner*—Bentsu Ro
*Attorney, Agent, or Firm*—Mark A. Navarre

[57] ABSTRACT

Stable current control to an inductive load uses a digital driver having registers loaded with load control parameters from a microprocessor. The parameters, along with a counter responsive to clock pulses, control a pulse period and a pulse width which are used to operate an FET in series with the load to control load current. Current mode control develops a decreasing current limit voltage in each pulse period by decrementing a down counter at a rate and from an initial value commanded by the microprocessor, and converting the value to an analog current limit signal. The signal is compared to a load current feedback signal and the pulse width is truncated if the load current reaches the current limit signal.

16 Claims, 3 Drawing Sheets

DIGITAL SLOPE COMPENSATION IN A CURRENT CONTROLLER

FIELD OF THE INVENTION

This invention relates to the control of current in an inductive load and particularly to a method and apparatus for pulse by pulse current control.

BACKGROUND OF THE INVENTION

It is known to use closed loop control to furnish DC current to an inductive load, a brushless motor for example, from a DC source by pulse width modulation. A microprocessor determines on the basis of the motor characteristics, feedback of operating parameters and the desired performance, the pulse duty cycle to be applied to a power switching device to attain the desired load current. Where a current control loop measures load current and compares the measured current to a fixed current limit, a loop instability can occur for duty cycles greater then 50%. That occurs since the average load current increases as the duty cycle increases.

The instability is avoided by progressively decreasing the current limit from an initial value at the beginning of each cycle. When the slope of the current limit is properly selected, the average current will remain the same as duty cycle varies, lending stability to the current loop. Prior circuits to accomplish this stabilized control use analog integrated circuitry with external components; these require precision passive components to minimize errors in the system. The exact values of external components depend on manufacturing tolerances and vary with temperature, resulting in a circuit with variable accuracy and controllability.

SUMMARY OF THE INVENTION

It is therefore an object of the invention to control an inductive load with a stable circuit not subject to manufacturing tolerances and temperature variations. Another object is to accomplish such control without external components.

A current control converter for a brushless motor operated from battery voltage in an automotive vehicle employs a digital circuit under control of a microprocessor and having no external components. A digital IC has a communication interface for exchanging information with the microprocessor and includes registers for storing parameters supplied by the microprocessor for motor control, the parameters being subject to change according to motor operation changes. A clock operating at a set frequency provides clock pulses and the parameters are referenced to those pulses by stating the number of pulses needed for a given funcron or a divisor for scaling the clock frequency. A frequency register contains a value which sets the period of load current pulses and a pulse width register contains the number of clock pulses in the ON duty cycle of load current pulses. A frequency counter responsive to the clock pulses continuously counts up until it is reset to repeat the count for a succeeding period. At the time of reset a load pulse as well as a new period starts. When the count attains the value in the pulse width register a comparator signals the termination of the load pulse. When the count attains the value in the frequency register, another comparator resets the counter and thus triggers the beginning of a new pulse period. The load pulse activates a pulse generator which in turn operates one or more power FETs in series with the inductive load to determine the load current. This counter configuration sets the voltage control mode.

The current control mode, however, limits the amount of load current and overrides the voltage control mode.

In the current control mode, a slope register contains a prescale value which configures another counter to produce a series of lower frequency clock pulses am a submultiple of the clock frequency. A maximum current register has an initial current value which is loaded into a down counter just prior to the beginning of each period. Each of the lower frequency clock pulses decrements the down counter by subtracting a value at fixed intervals from the down counter count. A digital to analog converter translates the resulting digital current limit to an analog value which is compared to a sensed value of load current. When the sensed current value attains the current limit, the load pulse is terminated, thereby truncating the pulse width which was set in the pulse width register. The negatively sloping current limit decreases the allowable peak current with increase in duty cycle to maintain the same average current for different duty cycles while in the current control mode.

To prevent truncation of the pulse width due to load current transients at the beginning of each period on the current control mode, a digital filter is used. A filter register is loaded with a number of pulses and the current mode output is blocked for that number of pulses at the beginning of each period.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

The ensuing description is directed to a current control converter for an inductive load as applied to a brushless motor, although the invention applies to such controls for other inductive loads. The brushless motor preferably has a three-phase winding, but for purposes of a clear disclosure the detailed circuit description is directed to a single phase control.

Figure 1:
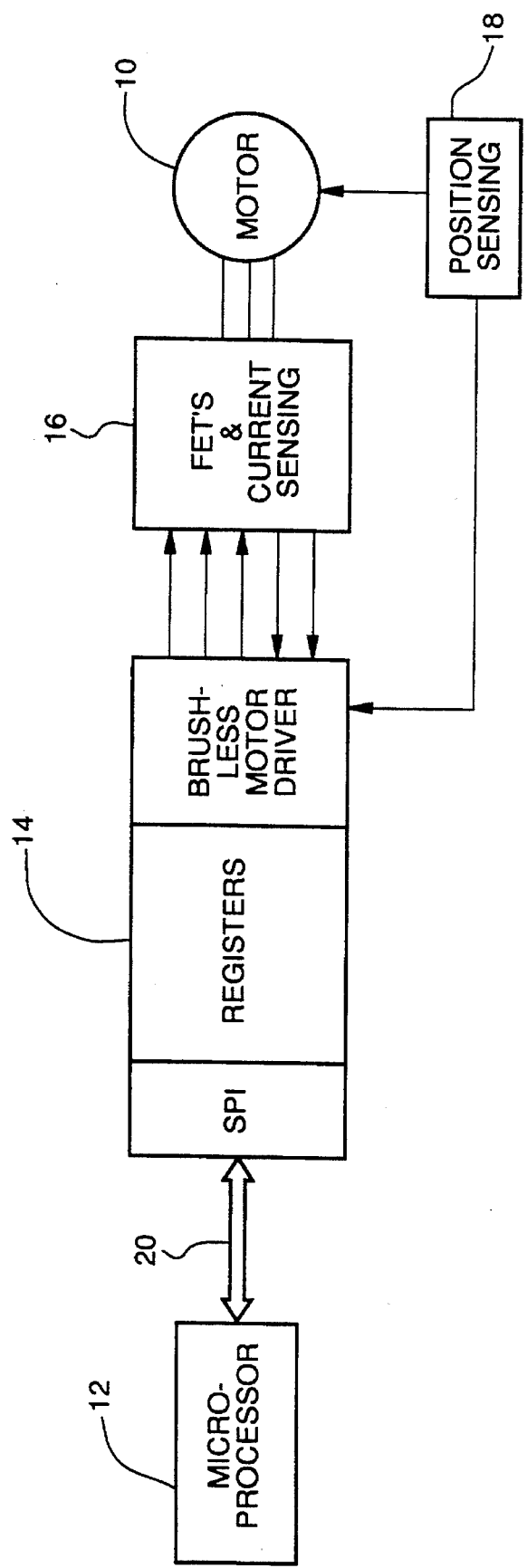
FIG. 1 is a block diagram of a motor control including a motor driver according to the invention.

Referring to FIG. 1, a controller for a brushless motor 10 in a motor vehicle includes a microprocessor 12 for determining motor control parameters on the basis of the motor characteristics and the desired performance, a motor driver 14 for generating motor control current consistent with the parameters furnished by the microprocessor, a power FET circuit 16 for applying motor current under the direction of the driver 14 and including a current sensing facility for feedback purposes, and a position sensing utility 18 producing feedback information on motor direction and speed. The power FETs are operated according to individual commands from the driver for supply of each phase of the motor. Except for the specific digital control aspects of the motor driver, the motor control arrangement is well known and is not further described here.

The microprocessor 12 communicates by a bus 20 with a 16-bit serial peripherial interface (SPI) in the driver 14 to write certain data to registers in the driver and to read data from other registers. The data written to the registers comprises motor control parameters. The data read from the registers comprises motor speed (derived from position sensing circuit 18), motor current (from the current sensing facility), and fault data provided by diagnostic features, not shown.

Figure 2:
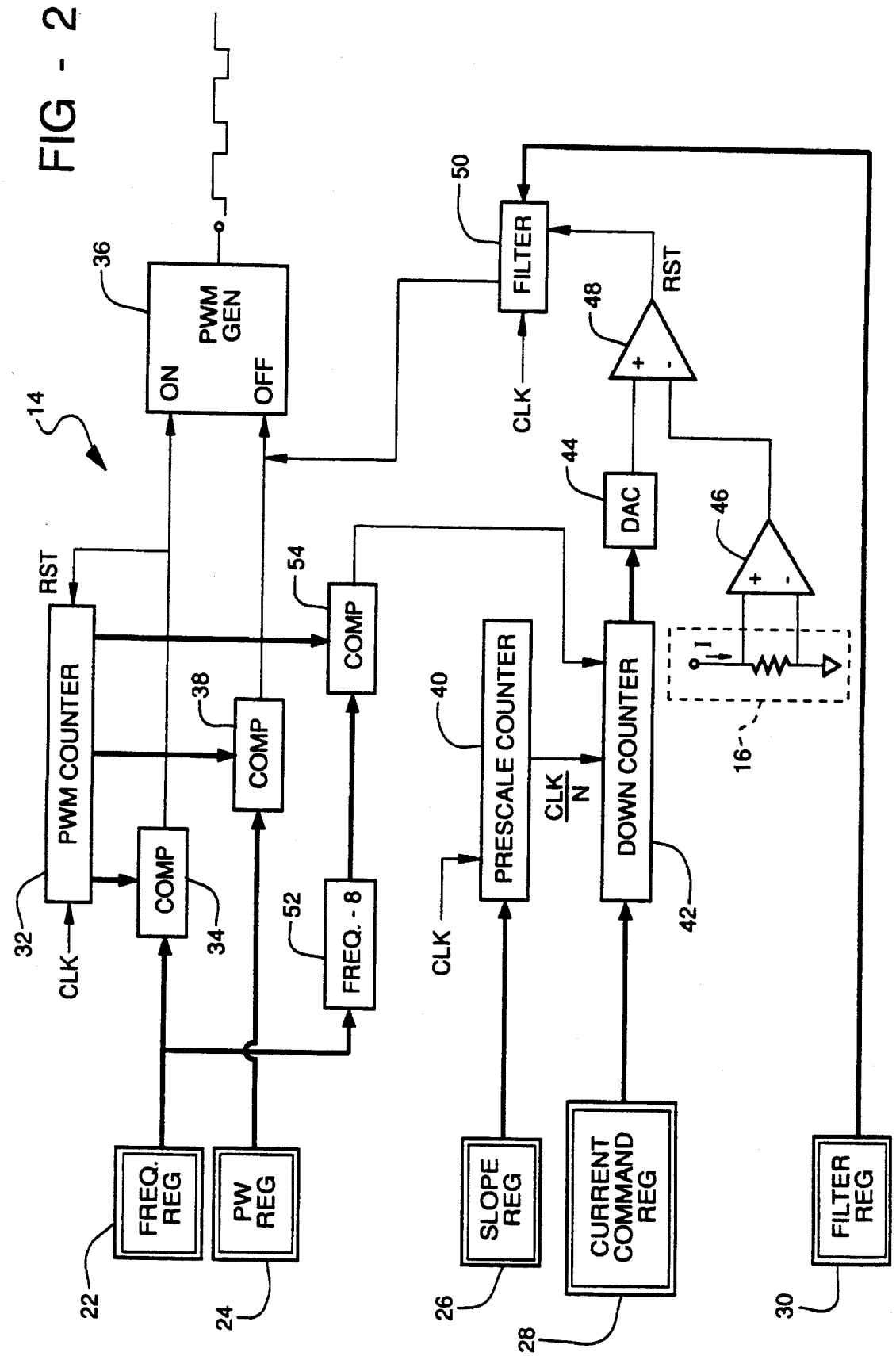
FIG. 2 is a schematic diagram of a digital driver circuit for the motor control of FIG. 1 according to the invention.

As shown in FIG. 2, the driver has a 7-bit frequency register 22, a 7-bit pulse width register 24, a 2-bit slope register 26, an 8-bit current limit register 28 and a filter register 30. A clock comprising a crystal oscillator and a prescalor, not shown, provides clock pulses CLK for driving the digital circuitry. A 7-bit PWM counter 32 continuously counts clock pulses, and a comparator 34 coupled to the counter 32 and the frequency register 22 issues an output when the count reaches the value in the frequency register. The output resets the PWM counter 32 and is connected to an ON port of a PWM generator 36 to trigger a positive command pulse to turn on an FET in the power circuit 16. A second comparator 38 is coupled to the pulse width register 24 and to the PWM counter 32. When the register 24 value is reached by the counter, the comparator 38 produces a pulse termination signal which is coupled to an OFF port of the PWM generator 36. Thus the PWM generator 36 will produce a pulse width modulated signal having a period determined by the content of the frequency register 22 and a command pulse width determined by the content of the pulse width register 24. This operation, if not interrupted, is the voltage control mode.

Current control mode is provided by additional circuitry to override the pulse width output by truncating the pulse whenever necessary to limit the average current to prevent unstable motor operation. A 2-bit prescale counter 40 driven by the clock and configured by the content N of the slope register 26 counts down to zero, issues an output pulse, and reloads the value N of the slope register to repeat the sequence, thereby yielding a pulse frequency which is a submultiple of the clock frequency, the divisor being determined by the slope register value N. An 8-bit down counter 42 is connected to the prescale counter output and to the current register 28; the down counter is initially loaded with the content of the current register 28 and decrements one count for each output pulse of the prescale counter. The down counter digital value thus is refreshed at the beginning of each period or earlier with the value in the current register and then progressively decreases throughout the remainder of the period at a rate set by the slope register. The digital value is applied to a digital-to-analog converter (DAC) 44 which generates an analog signal representing a current limit. The load current is sensed by a resistor in the circuit 16 and the voltage developed across the resistor is input to an amplifier 46. The motor current is compared to the sloping current limit by a comparator 48 so that if the motor current reaches the current limit the comparator 48 issues a reset signal RST which is coupled to the OFF port of the PWM generator to terminate the pulse, even prior to the pulse ending time scheduled by the pulse width register.

Figure 3:
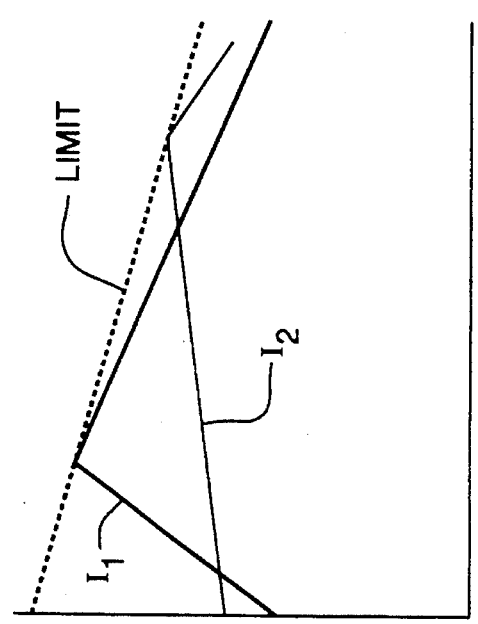
FIG. 3 is a graph of load current and current limit as controlled by the digital driver.

FIG. 3 shows the negatively sloped current limit and the load current in one period for two different current values. Current $I_1$ reaches the current limit early in the period and has a high peak value compared to the current $I_2$ which reaches the sloping current limit later in the period. By proper selection of the current limit slope, the two currents will have the same average value.

Referring again to FIG. 2, two features are provided to assure proper operation at the beginning of each cycle. Because transients can occur upon the switching on of load current, there is a possibility of producing a current spike sufficient to exceed the current limit and trigger the comparator 48. To avoid the termination of the pulse, a digital filter 50 blocks the signal from the comparator 48 at the beginning of the period. The filter 50 is coupled to the clock and the filter register 30 and is effective for the number of counts in the register to mask the effects of a transient.

The other feature recognizes that the DAC 44 output can not instantly increase from a zero output to the initial current input to yield the desired high current limit at the beginning of each period. To compensate for the time delay, down counter is loaded a few counts prior to the beginning of the period, thereby giving the DAC time to reach the correct limit voltage. A register 52 is loaded with a count value which is 8 counts less than the value in the frequency register 22. A comparator 54 responsive to the register 52 value and to the down PWM counter 32 count issues an output 8 counts before the period ends. That output is fed to a terminal of the down counter which causes it to load the current register 28 value.

Figure 4:
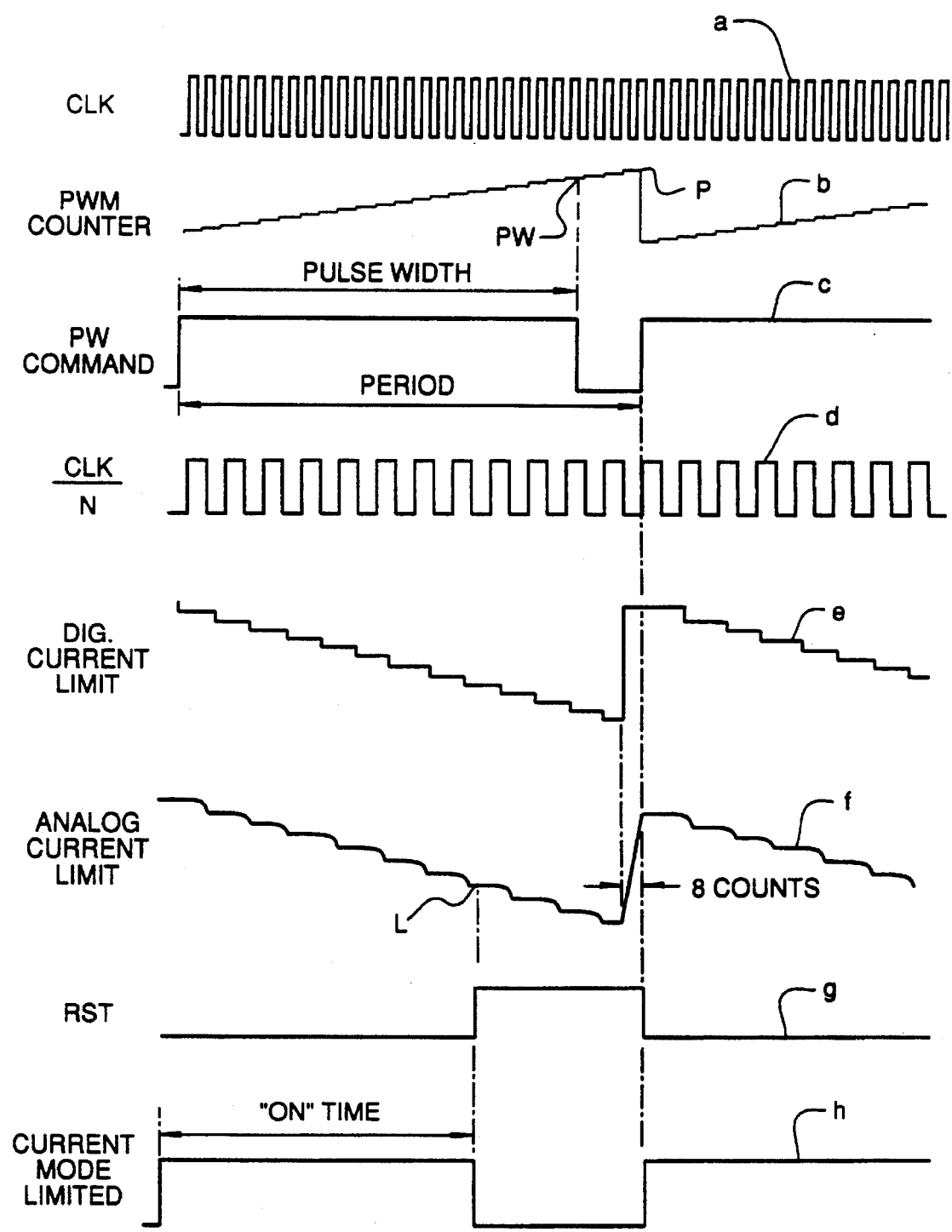
FIG. 4 is a series of waveforms illustrating the operation of the digital driver circuit.

FIG. 4 shows waveforms illustrating the operation of the driver circuit. Waveform a represents the clock pulses CLK and waveform b shows the increasing digital content of the PWM counter 32. The pulsewidth command from the PWM generator is shown in waveform c, the pulse being positive until the PWM counter reaches a value PW and the period beginning anew when the PWM count reaches the value P. The reduced frequency clock signal CLK/N put out by the prescale counter 40 and shown as waveform d is effective at each pulse to decrement the digital current limit value in the down counter 42 as shown at waveform e. The DAC 44 analog output appears at waveform f. It should be noted that by loading a new current value in the down counter 8 counts prior to the beginning of the next period allows the DAC output to gradually increase to its full value at the new period. Assuming that the sensed load current reaches the limit current at point L, the reset signal RST is issued by the comparator 48 as shown in waveform g, and the current mode limited pulse is truncated at that time as illustrated in waveform h.

It will be seen that the digital motor driver can accurately execute current mode control by decrementing a current limit value in each pulse period for comparison with sensed load current, and truncating the output pulse. This is accomplished in an integrated circuit without any external components, thereby avoiding problems with component tolerances and thermally induced variations in component values.

The embodiments of the invention in which an exclusive property or privilege is claimed are defined as follows:

1. A current control converter for an inductive load operated by a host microprocessor comprising: a clock for issuing clock pulses;

first counter means responsive to the clock pulses for generating a variable width pulse signal having a cycle period and a pulse width set by the microprocessor;

means for supplying load current in response to the variable width pulse signal;

second counter means responsive to the clock pulses for defining a decreasing current limit during each cycle period; and means monitoring load current and responsive to the decreasing current limit for truncating the pulse width when the current reaches the limit before the end of the defined pulse width.

2. The invention as defined in claim 1 wherein the second counter means is a down counter having an initial value in each period and a set rate of decrease, the initial value and the set rate of decrease being set by the microprocessor to establish the decreasing current limit.

3. The invention as defined in claim 1 wherein the second counter means comprises:

a down counter;

a maximum current register holding the initial value to be loaded into the down counter in each period;

a prescale counter responsive to the clock pulses for moderating the count rate of the down counter; and a prescale register for configuring the prescale counter, the register values thereby controlling the initial value and the rate of decrease of the current limit.

4. The invention as defined in claim 3 including means for supplying the register values by the microprocessor.

5. The invention as defined in claim 3 wherein:

the first counter means includes a first counter responsive to the clock pulses and means responsive to the first counter count for establishing a period beginning at a first set count value; and the second counter means includes means for loading the initial value into the down counter including a comparator responsive to the counter count for producing a load signal a set number of counts before reaching the first set count value.

6. The invention as defined in claim 3 wherein the first counter means includes:

a counter responsive to the clock pulses;

a first comparator responsive to the counter count for producing a period signal upon reaching a first set count value;

a second comparator responsive to the counter count for producing a pulse termination signal upon reaching a second set count value; and a third comparator responsive to the counter count for producing a reset signal a set number of counts before reaching the first set count value;

and wherein the second counter means includes means responsive to the reset signal for loading the initial value into the down counter.

7. The invention as defined in claim 1 wherein the first counter means includes:

a counter responsive to the clock pulses;

a first comparator responsive to the counter count for producing a period signal upon reaching a first set count value; and a second comparator responsive to the counter count for producing a pulse termination signal upon reaching a second set count value representing pulse width.

8. The invention as defined in claim 1 wherein the first counter means includes:

a counter responsive to the clock pulses;

a frequency register under microprocessor control containing a period count value;

a first comparator responsive to the frequency register and the counter count for producing a period signal upon reaching the period count value;

a pulse width register under microprocessor control containing a pulse width count value; and a second comparator responsive to the pulse width register and the counter count for producing a pulse termination signal upon reaching the pulse width count value.

9. The invention as defined in claim 1 including filter means for disabling the means for truncating the pulse width for a set number of clock pulses at the beginning of each period, thereby avoiding effects of load current transients.

10. The invention as defined in claim 1 wherein the means for truncating the pulse width includes:

a register holding a count number; and a digital filter responsive to the register and to the clock pulses for disabling the truncating means at the beginning of each pulse for an interval determined by the count number in the register.

11. In a controller for an inductive load wherein control parameters are set by a microprocessor to control a load current device for supplying load current, a method of controlling current pulses comprising the steps of:

counting clock pulses and comparing the count to first and second parameters to establish a pulse width interval and a pulse period;

turning on the load current device at the beginning of each period and turning off the device at the end of each pulse width interval;

sensing the value of load current;

in each period setting a digital initial load current limit value and then progressively decrementing the value;

comparing the load current limit value and the sensed load current value; and overriding the pulse width interval by turning off the load current device when the sensed load current value attains the load current limit value.

12. The invention as defined in claim 11 wherein the step of setting a digital initial load current limit value and then progressively decrementing the value comprises:

setting maximum current and slope parameters;

for each period initially setting a count equal to the maximum current parameter and then decrementing the value according to the slope parameter.

13. The invention as defined in claim 11 wherein the step of setting a digital initial load current limit value and then progressively decrementing the value comprises:

setting maximum current and slope parameters;

for each period initially setting a current limit count equal to the maximum current parameter;

dividing the frequency of the clock pulses by the slope parameter to obtain a series of decrement pulses; and reducing the current limit count for each decrement pulse.

14. The invention as defined in claim 13 wherein the step of initially setting a current limit count for each period is carried out in the last several counts of the previous period, thereby assuring the limit count is initially high when current comparison occurs at the beginning of each period.

15. The invention as defined in claim 11 including the further steps of:

disabling the overriding step for a mask period at the beginning of each period to mask the effect of transient signals when the device is just turned on.

16. The invention as defined in claim 11 including the further steps of:

setting a filter parameter comprising a number of clock pulses;

at the beginning of each period disabling the overriding step for the number of clock pulses set by the filter parameter to prevent pulse termination due to initial current transients.

* * * * *